Oct. 31, 1950 — R. A. BRADEN — 2,527,910
BALANCED MICROWAVE DETECTOR AND MIXER
Filed Nov. 12, 1946 — 2 Sheets-Sheet 1
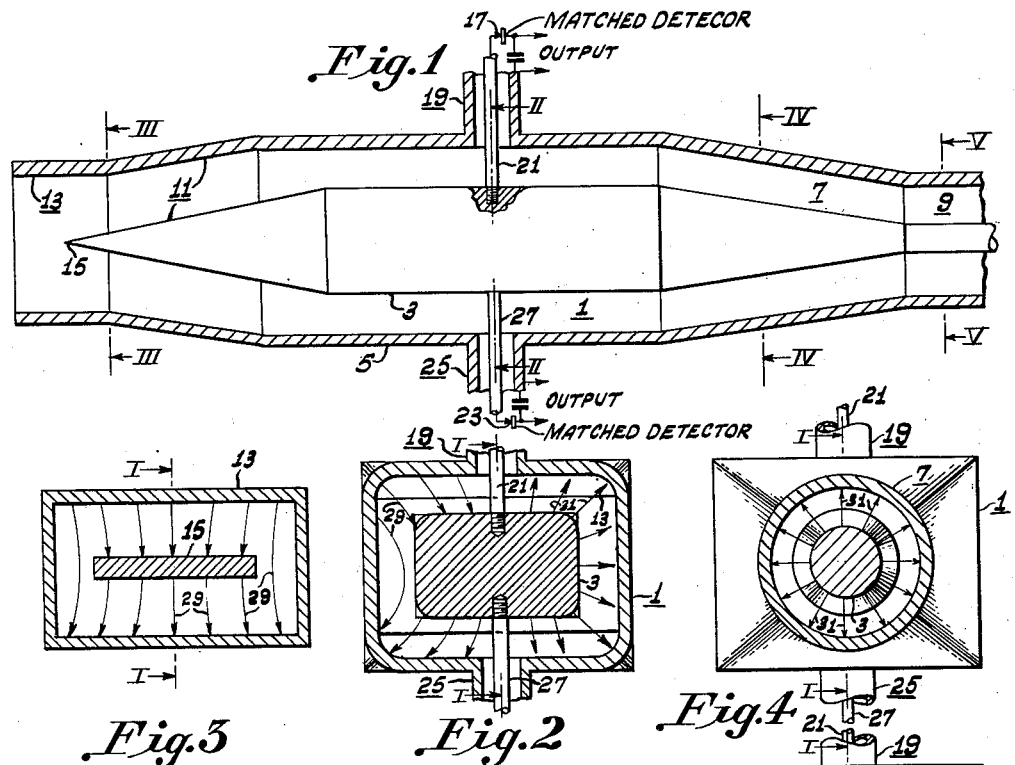
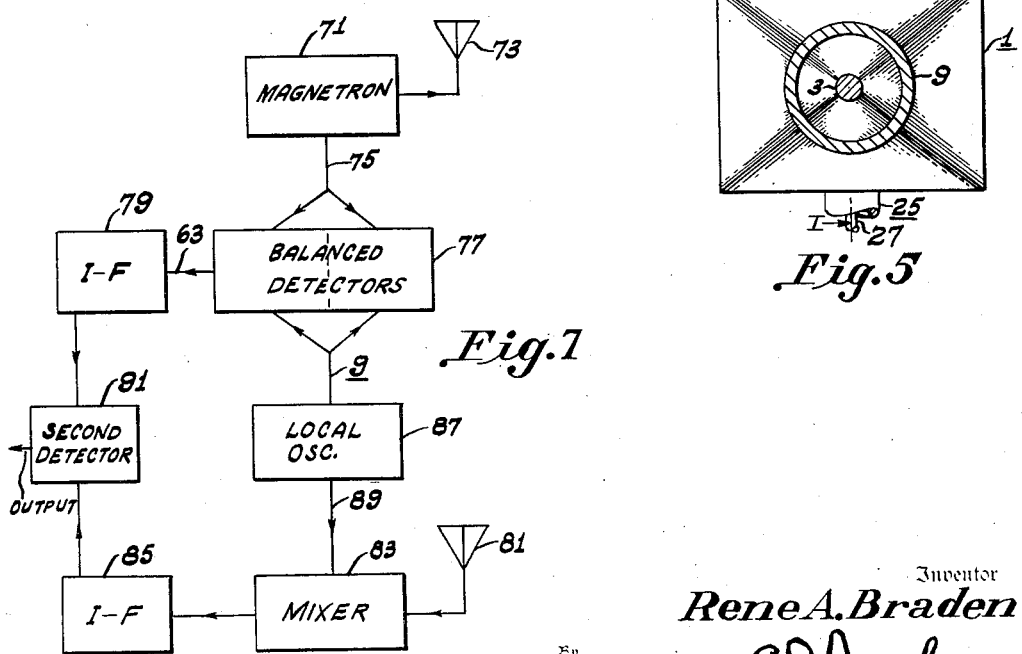
Inventor
Rene A. Braden

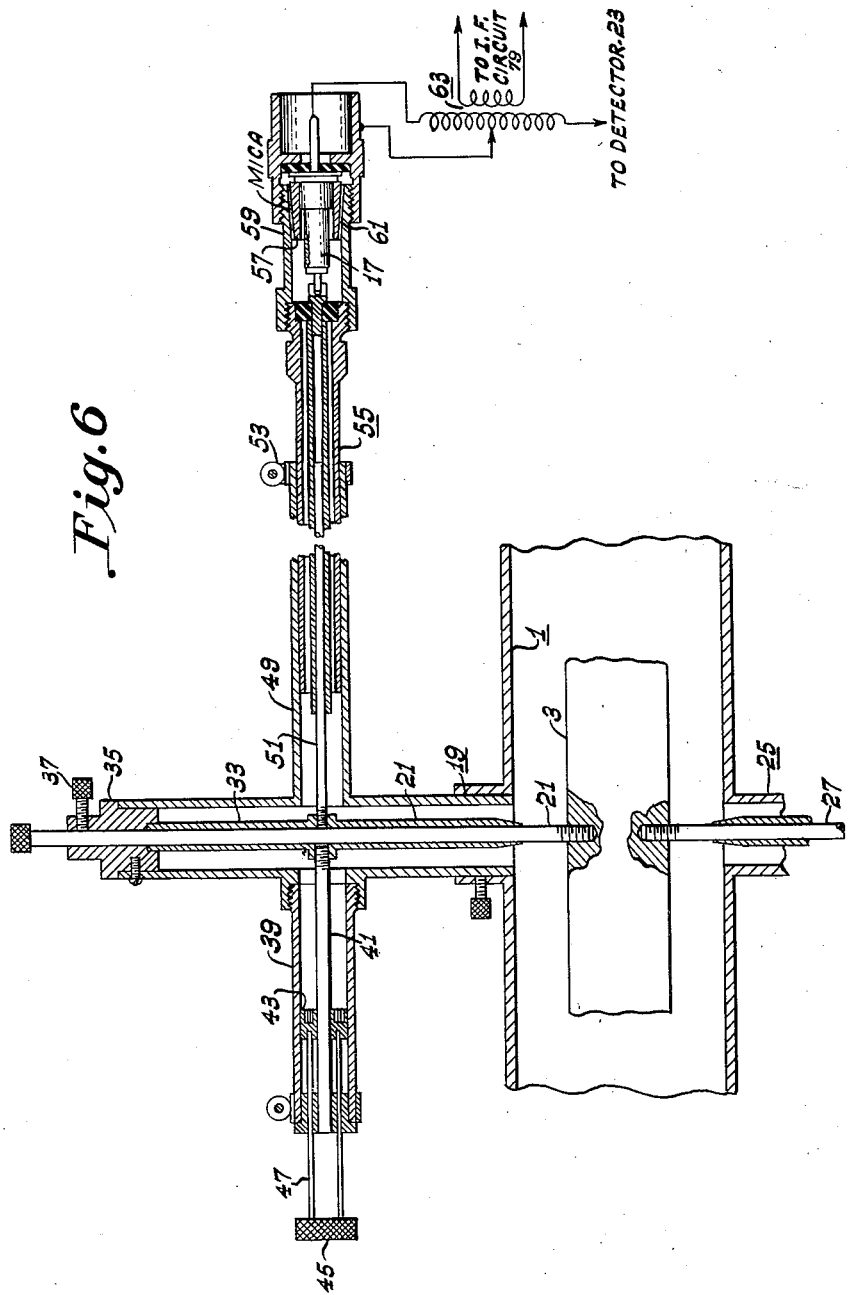

Patented Oct. 31, 1950

2,527,910

UNITED STATES PATENT OFFICE 2,527,910

BALANCED MICROWAVE DETECTOR AND MIXER

Rene A. Braden, Princeton, N. J., assignor to Radio Corporation of America, a corporation of Delaware Application November 12, 1946, Serial No. 709,353

12 Claims. (Cl. 250—20)

This invention relates generally to microwave receiving systems and more particularly to a balanced detector and mixer for use in microwave superheterodyne circuits and the like.

The first detector or mixer circuits of microwave superheterodyne receivers have been found to operate most satisfactorily if a balanced detector circuit is employed. For most efficient operation of such detectors, the input signal source and the local heterodyne signal source both must be matched to the detector circuit. It is also essential that reaction between the input signal source and the local heterodyne signal source be minimized to prevent undesired signal interference. Either microwave crystals or diode thermionic tubes are commonly employed as microwave detectors, and either of these devices may be included in a balanced detector circuit according to the invention.

Briefly, the instant invention comprises a balanced detector circuit for mixing signals derived from a pair of microwave signal sources, (such as an input signal source and a local heterodyne signal source), wherein the microwave detectors are coupled into a microwave cavity which is fed from one side by a coaxial line circuit and fed from the opposite side by a waveguide circuit. The waves in the waveguide and coaxial line coupling circuits are propagated in different modes which couple to both of the microwave detectors coupled to the cavity but which are not coupled into the other of the signal circuits.

A preferred embodiment of the instant invention comprises a coaxial coupling cavity into which the balanced detectors are coupled and matched, and which includes a tapered terminating element of the center conductor of the coaxial line which is coupled into one side of the cavity. The waveguide, through which waves are propagated in the $TM_{11}$ mode, is coupled into the opposite side of the coupling cavity adjacent to the tapered end of the coaxial line inner conductor. The matched detectors are coupled through additional coaxial lines coupled into the cavity on opposite sides of the tapered inner conductor. With this arrangement, the coaxial line couples one of the input signals to the two detectors in the same phase, while the waveguide couples the other input signals to the two detectors in opposite phase.

This latter condition obtains since the $TM_{11}$ wave propagated through the waveguide effectively is split by the tapered center conductor in the coupling cavity, whereby it excites oppositely phased voltages in the two detectors coupling circuits which are coupled to opposite sides of the center conductor. The $TM_{11}$ waves propagated through the waveguide and into the coupling cavity are greatly attenuated and effectively suppressed in the coaxial line input circuit due to the wave cut-off characteristics of the relatively small radius input coaxial line. Similarly the input signals propagated along the coaxial line input circuit and into the coupling cavity are effectively prevented from entering the waveguide input circuit due to the disappearance of the inner conductor. It should be understood that the input waveguide must be sufficiently small so that waves in the $TM_0$ mode will not be generated at the end of the center conductor and transmitted backwards through the waveguide.

Either the input signals or the heterodyne signals may be coupled into the mixer circuit through the waveguide, depending upon the type of transmission circuit coupled to the particular signal source. The only essential requirement is that one of the input signal sources be coupled to the balanced detector through a waveguide, and that the other signal source be coupled thereto through a coaxial line.

One of the most important applications of the instant invention is the use of the novel balanced detector network in an FM radar system wherein the intermittently varying transmitted signal frequencies are compared with reflected received signal frequencies to determine the distance of a reflecting object. In such systems it is essential that the portion of the transmitted signals derived from the magnetron transmitter be coupled only to the balanced detectors and that no reaction exist between the transmitter and the local receiver heterodyne oscillator or receiver input circuit. By coupling the transmitter magnetron and the local oscillator to opposite sides of the novel balanced detector described herein, efficient coupling to the mixer from both the transmitter and the local oscillator is provided with a minimum of undesired reaction between the signal sources. This arrangement also permits the local oscillator to be coupled to both mixer circuits without reaction between the transmitter and the receiver input mixer circuit.

Among the objects of the invention are to provide an improved method of and means for detecting and mixing microwave signals. Another object is to provide an improved microwave mixer circuit including a balanced microwave detector network. A further object is to provide an improved microwave balanced detector and mixer network in which the detectors are effectively matched to two different signal sources, and the signal sources are effectively isolated from each other. A still further object of the invention is to provide an improved microwave balanced detector and mixer network wherein a first source of signals is coupled into the network through a waveguide transmission system and a second source of signals is coupled into the network through a coaxial line transmission system. Another object is to provide an improved microwave balanced detector and mixer network for a frequency modulation type of radar system. An additional object is to provide a balanced microwave detector network comprising a coaxial line coupling transformer for coupling a balanced detector system to two sources of input signals which are coupled into the transformer in different wave propagation modes.

The invention will be described in greater detail by reference to the accompanying drawings of which Figure 1 is a cross-sectional elevational, partially schematic, view of a preferred embodiment of the invention; Figure 2 is a cross-sectional elevational view of said embodiment taken along the section line II—II of Fig. 1; Figure 3 is a cross-sectional elevational view of said embodiment of the invention taken along the section line III—III of Fig. 1; Figure 4 is a cross-sectional elevational view of said embodiment of the invention taken along the section line IV—IV of Fig. 1; Figure 5 is a cross-sectional elevational view of said preferred embodiment of the invention taken along the section line V—V of Fig. 1; Figure 6 is an enlarged, fragmentary, cross-sectional elevational view of a balanced detector matching network forming a portion of the preferred embodiment of the invention shown in Fig. 1; and Figure 7 is a block schematic circuit diagram of an FM radar receiver system utilizing the invention. Similar reference characters are applied to similar elements throughout the drawings.

Referring to Figures 1 to 6 of the drawings, a preferred embodiment of the invention includes a coaxial coupling unit 1 comprising concentrically disposed inner and outer conductors 3, 5, respectively. Both coaxial conductors of the right hand portion 7 of the coupling unit 1 are tapered to couple to a first input coaxial line 9 which is connected to a first source of microwave signals, not shown. Both conductors of the left hand portion 11 of the coupling unit 1 also are tapered to couple into a waveguide 13 which is connected to a second source of microwave signals, not shown. The center conductor 3 of the coupling unit 1 is tapered through the coupling portion 11 to a point or sharp edge 15 at the entrance to the waveguide 13. Preferably the waveguide 13 is of rectangular cross-section as shown in Fig. 3, and the tapered portion of the inner conductor 3 also is of rectangular cross section. The central portion of the coupling unit 1 also preferably is of rectangular cross section as shown in Fig. 2, and the right hand portion thereof tapers to a circular cross section as shown in Fig. 4 to merge with the coaxial line 9 as shown in Fig. 5.

A first matched microwave detector 17, which may comprise either a microwave crystal or a diode thermionic tube, is coupled through a first output coaxial line 19 to the upper center portion of the coupling unit 1. The inner conductor 21 of the first output coupling line may be threaded into the upper surface of the central portion of the inner conductor 3 of the coupling unit. Similarly, a second microwave detector 23 is coupled to the coupling unit 1 through a second output coupling coaxial line 25 having its inner conductor 27 threaded into the lower surface of the center conductor 3 of the coupling unit 1. The microwave detectors 17, 23 preferably are matched to the coupling unit 1 and to the microwave signal sources. A typical structure of coaxial line type is shown in Figure 6 for matching a crystal rectifier to the system.

In Figure 2 the curved arrows 29 on the left hand portion of the figure indicate the direction of the electric field established at the central plane II—II due to waves propagated in the $TM_{11}$ mode through the waveguide 13, whereby the field 29 is coupled in opposite phase to the output coaxial lines 19 and 25. The arrows 31 shown on the right hand side of the figure indicate the electric field established at the central plane II—II of the coupling unit 1 by waves propagated through the coaxial line 9 and the right hand coupling section 7. It is seen that the waves propagated through the coaxial line input circuit are coupled in similar phase to both output coaxial lines 19 and 25. It should be understood that the electric fields 29 and 31 both extend throughout the complete cross section of the coupling unit at its central plane II—II.

If considerations of coupling efficiency permit, the output coupling lines 19 and 25 may be omitted, and the microwave crystal or diode detectors may be enclosed within the central portion of the coupling unit 1, and effectively connected between the inner and outer conductors thereof on opposite sides of the coupling unit. However, if efficient coupling is desired to both of the detectors, they must be matched to the coupling unit and to the input signal transmission systems. The matching system illustrated in Fig. 6 provides a convenient means for tuning the detector circuits to prevent wave reflections in the system. Only the upper matching output line is shown, and it is understood that the lower line 25, 27 is of identical construction.

The detector matching line shown in Fig. 6 comprises a vertical coaxial line section 19 having a tubular inner conductor 33 through which passes the center conductor 21 having its end threaded into the center conductor 3 of the coupling section 1. The coupling line 19 is short circuited at its upper end by means of a conductive plug 35 which includes a locking screw 37 for locking the center conductor 21 after assembly. A matching stub including an outer conductor 39 and an inner conductor 41 is tapped to an intermediate point on the vertical coaxial line 19. The matching stub includes a longitudinally adjustable shorting plug 43 which may be actuated by a knob 45 connected to the shorting plug through a pair of actuating rods 47. The detector branch coaxial line including concentric outer and inner conductors 49, 51, branches from the vertical coaxial line 19 at a point opposite the matching stub 39, 41. The detector branch line 49, 51 includes a telescopic joint 53 for a telescoping line section 55 which is terminated in the crystal detector 17. The detector terminal assembly includes a bypass capacitor provided between tapered telescoping elements 57, 59 which are separated by a thin layer of mica 61. The detector terminals are connected to any suitable balanced utilization circuit 63.

In operation the detector is matched to the coupling unit and to the signal sources by adjusting the longitudinal position of the shorting plug 43 in the matching stub 39, 41 and by adjusting the telescoping of the branch coaxial line portions 49, 55.

The circuit of Figure 7 illustrates the manner in which the novel balanced detector and mixer described heretofore may be employed in a microwave frequency-modulation radar system utilizing a magnetron pulse transmitter. The sawtooth frequency-modulated magnetron transmitter 71 radiates signals from a microwave antenna 73 and also supplies a reference signal on the line 75 which may be, for example, the waveguide portion 13 of the coupling unit 1. The coupling unit 1 and matched balanced detectors is indicated by the block 77, and the balanced output circuit 63 of the detectors is coupled to a first intermediate frequency amplifier circuit 79.

The transmitted signals which are reflected from a distant object are picked up by a receiving antenna 81 and applied to a second superheterodyne microwave mixer circuit 83, the output circuit of which is coupled to a second intermediate frequency amplifier circuit 85. A local heterodyne oscillator 87 is connected through the line 89 to the second mixer circuit 83 and is also connected through the coaxial line portion 9 of the coupling unit 1 to couple the local oscillator signals to the balanced detectors in the unit 77. In a system of the type described, the intermediate frequency signals derived from the intermediate frequency amplifiers 79 and 85 are compared in a second detector 91 to determine the difference frequency which is a measure of the distance of the reflecting object. Such FM radar systems are common in the art. However, the use of the novel coupling unit and balanced matched detectors in the block 77 permits the signals from the magnetron 71 and from the local oscillator 87 to be coupled efficiently to the balanced detectors without objectionable reaction between the magnetron transmitter and the local oscillator or second mixer circuit 83.

Thus the invention disclosed comprises an improved method of and means for providing a balanced detector and mixer network which may be coupled to a microwave waveguide and to a microwave coaxial line, each of which supplies microwave signals to the mixer, wherein the two signal sources are effectively and efficiently coupled to a pair of balanced matched microwave detectors but are effectively isolated from each other.

I claim as my invention:

1. A balanced detector network for mixing signals from a pair of microwave signal sources comprising means coupled in a first signal mode to one of said sources, second means coupled in a different signal mode to the other of said sources, coupling means interconnecting said first and second means, a pair of microwave detectors coupled into said coupling means and responsive in the same phase to signals of one of said modes and in opposite phase to signals of the other of said modes, said first and second means each being effectively isolated from the signal mode in the other of said means, and means for deriving mixed signals from said detectors.

2. A balanced detector network for mixing signals from a pair of microwave signal sources comprising a waveguide coupled to one of said sources, a coaxial transmission line coupled to the other of said sources, a coaxial coupling section of said coaxial line interconnecting said waveguide and said line, a pair of microwave detectors coupled into said section at diametrically opposite locations in a plane normal to said section, said waveguide and said line being effectively coupled to said detectors and being effectively isolated from each other, and means for deriving mixed signals from said detectors.

3. A balanced detector network including a pair of microwave signal sources, a waveguide coupled to one of said sources, a coaxial transmission line coupled to the other of said sources, a coaxial coupling section of said coaxial line interconnecting said waveguide and said line, a pair of microwave detectors coupled into said section at diametrically opposite locations in a plane normal to said section, said waveguide and said line being effectively coupled to said detectors and being effectively isolated from each other, and means for deriving mixed signals from said detectors.

4. A balanced detector network for mixing signals from a pair of microwave signal sources comprising a rectangular waveguide coupled to one of said sources, a concentric transmission line coupled to the other of said sources, a rectangular coupling section of said concentric line interconnecting said waveguide and said line, a pair of microwave detectors coupled into said section at diametrically opposite locations in a plane normal to said section, said waveguide and said line being effectively coupled to said detectors and being effectively isolated from each other, and means for deriving mixed signals from said detectors.

5. A balanced detector network for mixing signals from a pair of microwave signal sources comprising a waveguide of rectangular cross-section coupled in a first mode to one of said sources, a concentric transmission line coupled in a different mode to the other of said sources, a rectangular coupling section of said concentric line of larger cross-sectional area than said waveguide and said line interconnecting said waveguide and said line, a pair of microwave detectors coupled into said section at diametrically opposite locations in a plane normal to said section, microwave signals of said waveguide signal mode and said line signal mode being effectively coupled to said detectors and said waveguide and said line being effectively isolated from each other, and means for deriving mixed signals from said detectors.

6. A balanced detector network for mixing signals from a pair of microwave signal sources comprising a waveguide coupled to one of said sources, a coaxial transmission line coupled to the other of said sources, a coaxial coupling section of said coaxial line interconnecting said waveguide and said line, a pair of microwave detectors coupled into said section at diametrically opposite locations in a plane normal to said section, means for matching said detectors to said waveguide and to said line, said waveguide and said line being effectively coupled to said detectors and being effectively isolated from each other, and means for deriving mixed signals from said detectors.

7. A balanced detector network for mixing signals from a pair of microwave signal sources comprising a waveguide coupled to one of said signal sources, a transmission line having inner and outer coaxial conductors coupled to the other of said signal sources, a coupling section of said coaxial line having its outer conductor interconnecting said waveguide and said outer conductor of said line and having a tapered inner conductor connected to the inner conductor of said line and coupled into said waveguide, a pair of microwave detectors coupled between the conductors of said coupling section at diametrically opposite locations in a plane through and normal to the axis of said section, said waveguide and said line being effectively isolated from each other and being effectively coupled to both of said detectors, and means for deriving mixed signals from said detectors.

8. A balanced detector network for mixing signals from a pair of microwave signal sources comprising a waveguide of rectangular cross-section coupled to one of said signal sources, a concentric transmission line having inner and outer coaxial conductors coupled to the other of said signal sources, rectangular coupling section of said coaxial line having its outer conductor interconnecting said waveguide and said outer conductor of said line and having a tapered inner conductor connected to the inner conductor of said line and tapering to a point coupled into said waveguide, a pair of microwave detectors coupled between the conductors of said coupling section at diametrically opposite locations in a plane through and normal to the axis of said section, said waveguide and said line being effectively isolated from each other and being effectively coupled to both of said detectors, and means for deriving mixed signals from said detectors.

9. A balanced detector network for mixing signals from a pair of microwave signal sources comprising a waveguide of rectangular cross-section coupled in a first signal mode to one of said signal sources, a concentric transmission line having inner and outer coaxial conductors coupled in a different signal mode to the other of said signal sources, a rectangular coupling section of said coaxial line having its outer conductor interconnecting said waveguide and said outer conductor of said line and having a tapered inner conductor connected to the inner conductor of said line and taperingly coupled into said waveguide, a pair of microwave detectors coupled between the conductors of said coupling section at diametrically opposite locations in a plane through and normal to the axis of said section, said waveguide and said line being effectively isolated from the signals of the modes in each other and signals of both of said modes being effectively coupled to both of said detectors, and means for deriving mixed signals from said detectors.

10. A balanced detector network for mixing signals from a pair of microwave signal sources comprising a waveguide of rectangular cross-section coupled to one of said signal sources, a concentric transmission line having inner and outer coaxial conductors coupled to the other of said signal sources, a rectangular coupling section of said coaxial line having its outer conductor interconnecting said wave guide and said outer conductor of said line and having a tapered inner conductor connected to the inner conductor of said line and coupled into said waveguide, a pair of microwave detectors coupled between the conductors of said coupling section at diametrically opposite locations in a plane through and normal to the axis of said section, means for matching said detectors to said waveguide and said line, said waveguide and said line being effectively isolated from each other and being effectively coupled to both of said detectors, and means for deriving mixed signals from said detectors.

11. A balanced detector network including a pair of microwave signal sources, a waveguide of rectangular cross-section coupled to one of said signal sources, a concentric transmission line having inner and outer coaxial conductors coupled to the other of said signal sources, a rectangular coupling section of said coaxial line having its outer conductor interconnecting said waveguide and said outer conductor of said line and having a tapered inner conductor connected to the inner conductor of said line and coupled into said waveguide, a pair of microwave detectors coupled between the conductors of said coupling section at diametrically opposite locations in a plane through and normal to the axis of said section, means for matching said detectors to said coupling section, said waveguide and said line being effectively isolated from each other and being effectively coupled to both of said detectors, and means for deriving mixed signals from said detectors.

12. A balanced detector network for mixing signals from a pair of microwave signal sources comprising a waveguide coupled to one of said signal sources, a transmission line having inner and outer coaxial conductors coupled to the other of said signal sources, a coupling section of said coaxial line having its outer conductor interconnecting said waveguide and said outer conductor of said line and having a tapered inner conductor connected to the inner conductor of said line and coupled into said waveguide, a pair of microwave detectors coupled between the conductors of said coupling section at diametrically opposite locations in a plane through and normal to the axis of said section, said wave guide and said line being effectively isolated from each other and being effectively coupled to both of said detectors, and a balanced output circuit connected to said detectors for deriving mixed signals from said detectors.

RENE A. BRADEN.

REFERENCES CITED

The following references are of record in the file of this patent:

UNITED STATES PATENTS

| Number | Name | Date |
|---|---|---|
| 2,436,828 | Ring | Mar. 2, 1948 |
| 2,462,841 | Bruck et al. | Mar. 1, 1949 |
| 2,468,166 | Bruck | Apr. 26, 1949 |
| 2,469,222 | Atwood et al. | May 3, 1949 |